US000001265H

United States Statutory Invention Registration [19]

[11] Reg. Number: H1265

[43] Published: Dec. 7, 1993

Brady et al.

[54] FORMULATIONS OF 2-(DECYLTHIO)ETHANAMINE

[75] Inventors: Bonnie M. F. Brady, Sanford; James J. Havel, Midland, both of Mich.

[73] Assignee: The Dow Chemical Company, Midland, Mich.

[21] Appl. No.: 779,784

[22] Filed: Oct. 21, 1991

[51] Int. Cl.[5] ..... A01N 33/08

[52] U.S. Cl. ..... 514/665; 514/971; 422/28; 504/160

[58] Field of Search ..... 514/665, 971; 71/67; 422/28

[56] References Cited

U.S. PATENT DOCUMENTS

| | | | |
|---|---|---|---|
| 2,692,231 | 10/1954 | Stayner et al. | 71/67 |
| 3,291,683 | 12/1966 | Lamb | 514/665 |
| 3,494,758 | 2/1970 | Kopp et al. | 71/67 |
| 3,628,941 | 12/1971 | Marks | 71/67 |
| 3,996,193 | 12/1976 | DeRoo | 524/206 |
| 4,163,796 | 8/1979 | Burk | 514/528 |
| 4,232,041 | 11/1980 | Burk et al. | 514/528 |
| 4,320,231 | 3/1982 | Murphy | 568/494 |
| 4,673,516 | 6/1987 | Berry | 252/49.5 |
| 4,718,919 | 1/1988 | DeLue et al. | 44/319 |
| 4,761,427 | 8/1988 | Segall et al. | 514/528 |
| 4,781,847 | 11/1988 | Weitz | 252/49.5 |
| 4,816,061 | 3/1989 | Walter, Jr. et al. | 514/665 |
| 4,971,724 | 11/1990 | Kalota et al. | 562/565 |
| 4,982,004 | 1/1991 | Relenyi et al. | 564/488 |

FOREIGN PATENT DOCUMENTS

0320783A2 6/1989 European Pat. Off. .

OTHER PUBLICATIONS

*Derwent Publication,* D9-A1, Disinfection, etc/chemical, 86-181271/28, Intr. Detergent Timi, RO-87-92-0-A, Sep. 30, 1983.

*Chemical Abstracts,* 86:6978x, "Biocidal Properties of Anti-icing Additives for Jet Aircraft Fuels", Bailey et al., U.S. NTIS, AD Rep. (1976).

*Derwent Publication,* D9-A1, Disinfection, etc./chemical, 82039W/50, Coalite & Chemical Prods., GB 1417-117, Sep. 21, 1972.

*Derwent Publication,* D4-A2 Sterilisation, 86-339220/52, Moody J R Chem Pty, AU 8542-263A, Mar. 5, 1986.

*Derwent Publication,* D9-A1 Disinfection. etc/chemical, 01551V-BCD, Goldschmidt AGTH, BE-8022-05-Q, Jul. 11, 1971, "Mixed Long Chain Alkyl Amines—as microbicides".

*Primary Examiner*—Robert L. Stoll
*Assistant Examiner*—Joseph D. Anthony
*Attorney, Agent, or Firm*—John R. Schenian; Ronald G. Brookens; Richard G. Waterman

[57] ABSTRACT

The present invention is directed to an antimicrobial composition and a method of using said composition, comprising an antimicrobially effective amount of DTEA and an amount of 1-butanol, cyclohexanol, hexyl alcohol, isobutanol, ethylene glycol phenyl ether, propylene glycol phenyl ether, or a mixture thereof effective to result in the antimicrobial composition having a freezing point of less than 0° C. at atmospheric pressure.

21 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

FORMULATIONS OF 2-(DECYLTHIO)ETHANAMINE

BACKGROUND OF THE INVENTION

The present invention is directed to antimicrobial compositions including 2-(decylthio)ethanamine as the active agent which have lower freezing points than known compositions.

2-(Decylthio)ethanamine (hereinafter referred to as "DTEA") is a compound known to possess antimicrobial properties (see, for example, U.S. Pat. Nos. 3,291,683; 4,816,061; and 4,982,004). Compositions including DTEA are often used in cooling water towers, air washing systems and in other outdoor applications. A typical commercial DTEA composition, comprising 15 weight percent DTEA, 15 weight percent propylene glycol, and the balance water, typically begins to form crystals at 10° C. Prior to its use, a DTEA composition is often stored in unheated areas and can be exposed to temperatures and conditions which can cause the DTEA composition to freeze. Such freezing often causes the DTEA composition to separate into different phases or a precipitate to form.

It would thus be desirable to develop antimicrobial compositions with DTEA as the active agent which have lower freezing points than known compositions. However, any additive to the DTEA composition which would help to lower the freezing point of the composition should not substantially affect the composition's antimicrobial properties. Also, any such additive should help to lower the freezing point of the composition for an extended period of time.

The present invention solves the above-indicated problems by providing antimicrobial compositions including DTEA as the active agent which have lower freezing points than known compositions, which remain stable for long periods of time, and which possess essentially the same antimicrobial efficacy as known compositions.

SUMMARY OF THE INVENTION

The present invention is directed to an antimicrobial composition comprising:

a. an antimicrobially effective amount of 2-(decylthio)ethanamine; and b. an amount of 1-butanol, cyclohexanol, hexyl alcohol, isobutanol, ethylene glycol phenyl ether, propylene glycol phenyl ether, or a mixture thereof, effective to result in the antimicrobial composition having a freezing point of less than 0° C. at atmospheric pressure.

The present invention is also directed to a method for inhibiting microorganisms in a microbial habitat comprising contacting said microbial habitat with an antimicrobially effective amount of an antimicrobial composition comprising:

a. an antimicrobially effective amount of 2-(decylthio)ethanamine: and b. an amount of 1-butanol, cyclohexanol, hexyl alcohol, isobutanol, ethylene glycol phenyl ether, propylene glycol phenyl ether, or a mixture thereof, effective to result in the antimicrobial composition having a freezing point of less than 0° C. at atmospheric pressure.

DETAILED DESCRIPTION

In the present specification and claims, the term "2-(decylthio)ethanamine" is meant to refer to the compound of the formula:

$$CH_3—(CH_2)_9—S—(CH_2)_2—NH_2$$

as well as functional derivatives of this compound such as, for example, salts, and in particular, acid addition salts. Such acid addition salts can typically be conveniently prepared by acidifying the 2-(decylthio)ethanamine with a suitable acid such as a mineral acid or a monofunctional or polyfunctional carboxylic acid to obtain the acid addition salt. Such acid addition salts are generally described, for example, in U.S. Pat. No. 4,816,061, incorporated herein by reference. The hydrochloride salt of 2-(decylthio)ethanamine, 2-(decylthio)ethanamine hydrochloride, is preferred.

As used herein, the term "microorganism" is meant to refer to bacteria, fungus, yeast, viruses, and algae.

As used herein, the term "antimicrobially effective amount" refers to that amount of DTEA, or of a DTEA composition of the present invention, needed to exhibit inhibition of selected microorganisms. Typically, this antimicrobially effective amount varies from providing about 0.01 part per million (ppm) to about 5,000 ppm by weight of DTEA to a microbial habitat being contacted with a DTEA composition. Such antimicrobially effective amounts typically vary depending upon the microorganism desired to be inhibited and the specific conditions of the microbial habitat being contacted with the DTEA composition. A preferred effective amount of the DTEA is from about 0.1 ppm to about 500 ppm, more preferably from about 1 ppm to about 50 ppm by weight, of a microbial habitat.

As used herein, the terms "inhibition", "inhibit", or "inhibiting" refer to the suppression, stasis, kill, or any other interference with the normal life processes of microorganisms that is adverse to such microorganisms, so as to destroy or irreversibly inactivate existing microorganisms and/or prevent or control their future growth and reproduction.

As used herein, the term "microbial habitat", refers to a place or type of site where a microorganism naturally or normally lives or grows. Typically, such a microbial habitat will be an area that comprises a moisture, nutrient, and/or an oxygen source such as, for example, a cooling water tower or an air washing system.

Test formulations of 2-(decylthio)ethanamine (DTEA) are made herein by diluting a DTEA concentrate with water and a candidate additive or additives. Control formulations are made by diluting a DTEA concentrate with water only. Unless otherwise stated, all component percentages herein are by weight basis and on an active basis.

A typical DTEA concentrate composition, such as might be prepared from the MEAH process described below, is listed below:

45 percent—2-(decylthio)ethanamine hydrochloride
45 percent—propylene glycol or tetraethylene glycol
7 percent—water
3 percent—DTEA production impurities, such as 1-decene, cysteamine hydrochloride, and others As used herein, a DTEA concentrate comprising propylene glycol is referred to as DTEA.PG: whereas, a DTEA concentrate comprising tetraethylene glycol is referred to as DTEA.TEG.

Although a typical DTEA concentrate composition will comprise about 45 weight percent 2-(decylthio)ethanamine, it must be appreciated that a typical DTEA concentrate composition might have a 2-(decylthio)ethanamine concentration ranging from about 40 to about 50 weight percent. As such, a typical diluted DTEA formulation used in a commercial setting might have a 2-(decylthio)ethanamine concentration ranging from about 12 to about 19 weight percent. Preferably, the 2-(decylthio)ethanamine concentration in such diluted DTEA formulations is from about 14 to about 16 weight percent. Such variation in the 2-(decylthio)ethanamine concentration may be due to such factors as process conditions, and imprecise dilution measurements.

Two processes are used to produce the DTEA concentrates used herein. The first process, herein referred to as the MEAH process, reacts mercaptoethylamine hydrochloride and decene in either propylene glycol or tetraethylene glycol. Such a process is generally disclosed, for example, in European Patent Application 320783-A. A DTEA concentrate comprising propylene glycol prepared using the MEAH process is referred to herein as MEAH DTEA.PG. Similarly, a DTEA concentrate comprising tetraethylene glycol prepared using the MEAH process is referred to herein as MEAH DTEA.TEG.

The second process, herein referred to as the ETOX process, reacts ethyloxazoline and decyl mercaptan in propylene glycol. Such a process is generally disclosed, for example, in U.S. Pat. No. 4,816,061. A DTEA concentrate comprising propylene glycol prepared using the ETOX process is referred to herein as ETOX DTEA.PG.

Generally, all DTEA.PG formulations used herein are made using the MEAH process concentrate. A control of ETOX DTEA.PG is used along with a MEAH DTEA.PG control. The DTEA concentrate in tetraethylene glycol (DTEA.TEG) is produced by the MEAH process only.

A DTEA concentrate is typically a solid at room temperature and requires melting before dilution. The concentrate is heated in a water bath to 45° C. for the DTEA.PG and to 80° C. for the DTEA.TEG. The DTEA.TEG typically requires more time to melt.

The formulations tested for freeze-thaw properties had the following general composition:

5–35 percent—2-(decylthio)ethanamine hydrochloride
0–57 percent—propylene glycol or tetraethylene glycol
0.05–67 percent—additive or additives
0–3 percent—DTEA production impurities, such as 1-decene, cysteamine hydrochloride, and others
Balance—Water Fifty grams of each test formulation is made at room temperature by addition of the appropriate amounts of DTEA concentrate, additive or additives, and water to a 2 ounce (0.06 liter) jar. The test formulation is mixed by gently shaking the jar by hand. The DTEA concentrate needs to remain warm during addition or a precipitate may form which should eventually dissolve with mixing. The order of addition of ingredients does not appear to affect the end product. Some additives tested are not soluble in water but are soluble in the DTEA concentrate. Those additives which were insoluble or reacted negatively with the DTEA by forming a precipitate were incompatible when the samples were made. Some became incompatible after completion of a freeze-thaw cycle.

Use of tap water or deionized water does not appear to affect the end product. Even though a commercial product would typically be made with tap water, deionized water is used to eliminate any variables in the test due to changes in water quality.

Because some test formulations foam upon mixing, the samples are allowed to set for several hours until any foam has dissipated. After such foam dissipation, the sample is split into two 25 g aliquots in 1 ounce (0.03 liter) glass or low-density polyethylene jars.

Commercially used DTEA formulations are often stored in polyethylene lined drums. Initially, polyethylene jars are used in conjunction with glass jars to determine if there is a difference in crystal formation with the two wall surfaces. No difference is observed, so glass jars are used exclusively in the remainder of the experiments because the glass jars give better visibility of the sample.

The interaction of selected test formulations and polyethylene is also studied. Polyethylene samples are cut from soft and rigid polyethylene bottles. The polyethylene samples are measured and weighed prior to being placed in 2 ounce (0.06 liter) jars. Fifty grams of selected formulations of DTEA are then added to each jar. The jars are loosely capped and placed at 45° C for one week. The polyethylene samples are rinsed with deionized water, towel dried and allowed to air dry for 30 minutes. The polyethylene samples are then reweighed and re-measured. No significant differences are seen in either the measurements or the weights of the polyethylene samples after incubation.

The pH of selected test formulations is measured. The tap water used has a higher pH than the deionized water used. As such, test formulations using tap water have a higher pH than test formulations using deionized water. An increase in DTEA concentration generally results in a slight decrease in formulation pH. The measured pH changes are not considered to be significant in the study of freeze-thaw properties.

In determining freeze-thaw properties, the samples are initially screened at 45° C., 25° C., 4° C. and −12° C. The samples are placed at the appropriate temperature for a minimum of 15 hours. The 45° C. samples are placed in a constant temperature cabinet, the room temperature samples are stored in a cabinet in the lab, the 4° C. samples are stored in an environmental chamber, and the −12° C. samples are stored in a freezer. The samples are visually evaluated for color, absence or presence of crystals or of a uniform slush, amount of crystal formation, and size of crystals. The samples are allowed to thaw at room temperature to determine if the mixture is homogeneous upon thawing. If the sample is not homogeneous upon thawing, it is gently shaken to see if the sample would become homogeneous. The samples at 45° C. and at room temperature do not change in 6 weeks so these test temperatures are discontinued. All samples, except one, freeze solid at −12° C. Therefore, 4° C. becomes the screening temperature of all samples.

Samples that are clear (no crystal formation) at 4° C. are tested at lower temperatures in a constant-temperature water bath. The temperature is set for two hours at 2° C. and the samples are evaluated as described above. The temperature is then lowered 2°–3° C. for another two hours and the samples are re-evaluated. This cycle is repeated until all the samples form crystals.

Selected controls and formulations which form crystals at 4° C. are also tested in the constant-temperature water bath to determine their freezing points. The temperature is set for 18° C. and lowered by 2° C. every two hours as described above until all samples have formed crystals.

In an attempt to remove particles that may cause crystal formation, selected control formulations are centrifuged for five minutes at 10,000 revolutions per minute (rpm), then ten minutes at 15,000 rpm. The samples are then decanted into clean 1 ounce (0.03 liter) glass jars and tested for freeze-thaw properties.

A single sample tested through several freeze-thaw cycles may exhibit a different form of freezing each cycle. The two aliquots of a sample could exhibit different freezing characteristics at a given temperature. The most desirable property is that the sample will remain clear during several freeze-thaw cycles.

Lowering the temperature of the tested formulations produces a variety of results. The most common are:

1. Formation of a two-phase system where a fine precipitate fills ¼ to ½ of the sample and is covered by a clear liquid layer.
2. Formation of various-sized immobile and/or mobile crystals ranging from one crystal to filling ¾ of the sample covered by a clear liquid layer.
3. Formation of a uniform white slush which varies in viscosity from water-like to very thick.
4. Frozen solid with crystals ranging from fine to large, or a mixture of crystal sizes.
5. The sample remains clear.

Table I shows the freezing point results of different DTEA formulations evaluated that are examples of the present invention. Table 11 shows the freezing point results of different DTEA formulations evaluated that are not examples of the present invention.

TABLE I

Test Formulations including 2-(Decylthio)ethanamine Hydrochloride Which are Examples of the Present Invention

| Ex. No. | Additive | Additive Concentration (Weight Percent) | DTEA Concentration (Weight Percent) | Glycol Type | Glycol Concentration (Weight Percent) | Freezing Point* (°C.) |
|---|---|---|---|---|---|---|
| 1 | 1-Butanol | 10 | 15 | TEG | 17.1 | −1 (4) |
| 2 | 1-Butanol | 15 | 15 | PG | 15 | −3 (4) |
| 3 | 1-Butanol | 15 | 15 | TEG | 17.1 | −3 (4) |
| 4 | 1-Butanol | 20 | 15 | PG | 15 | −8 (−6) |
| 5 | 1-Butanol | 20 | 15 | TEG | 17.1 | −6 (−3) |
| 6 | 1-Butanol | 30 | 15 | PG | 15 | −6 (−4) |
| 7 | 1-Butanol | 30 | 15 | TEG | 17.1 | −12 (−10) |
| 8 | 1-Butanol | 40 | 15 | PG | 15 | −4 (−2) |
| 9 | 1-Butanol | 50 | 15 | PG | 15 | −4 (−2) |
| 10 | Cyclohexanol | 20 | 15 | PG | 15 | −4 (−2) |
| 11 | Cyclohexanol | 30 | 15 | PG | 15 | −4 (−2) |
| 12 | Cyclohexanol | 30 | 15 | TEG | 17.1 | −8 (−5) |
| 13 | Cyclohexanol | 40 | 15 | PG | 15 | −8 (−6) |
| 14 | Cyclohexanol/Octanoic acid** | 10/5 | 15 | PG | 10 | −6 (−4) |
| 15 | Cyclohexanol/Octanoic acid** | 10/5 | 15 | PG | 15 | −2 (2) |
| 16 | Cyclohexanol/Octanoic acid/BARDAC 22** | 10/5/0.5 | 15 | PG | 15 | −4 (−2) |
| 17 | Cyclohexanol/Octanoic acid/BARDAC 22** | 10/5/1 | 15 | PG | 15 | −4 (−2) |
| 18 | Cyclohexanol/Octanoic acid/Methanol** | 10/5/1 | 15 | PG | 15 | −4 (−2) |
| 19 | Cyclohexanol/Octanoic acid/Methanol** | 10/5/2 | 15 | PG | 15 | −4 (−2) |
| 20 | DOWANOL EPh Glycol Ether | 20 | 15 | TEG | 8.6 | −4 (−2) |
| 21 | DOWANOL EPh Glycol Ether | 20 | 15 | TEG | 15 | −4 (−2) |
| 22 | DOWANOL EPh Glycol Ether | 30 | 15 | PG | 15 | −8 (−6) |
| 23 | DOWANOL EPh Glycol Ether | 30 | 15 | TEG | 8.6 | −8 (−6) |
| 24 | DOWANOL EPh Glycol Ether | 30 | 15 | TEG | 15 | −6 (−4) |
| 25 | DOWANOL EPh Glycol Ether | 40 | 15 | PG | 15 | −4 (−2) |
| 26 | DOWANOL EPh Glycol Ether | 40 | 15 | TEG | 8.6 | −10 (−8) |
| 27 | DOWANOL EPh Glycol Ether | 40 | 15 | TEG | 15 | −8 (−6) |
| 28 | DOWANOL EPh Glycol Ether/Antifoam FG-10 | 30/0.05 | 15 | TEG | 16.1 | −6 (−4) |
| 29 | DOWANOL EPh Glycol Ether/Antifoam FG-10 | 30/0.1 | 15 | TEG | 15 | −10 (−8) |
| 30 | DOWANOL EPh Glycol Ether/Octanoic Acid** | 10/5 | 15 | PG | 15 | −4 (−2) |
| 31 | DOWANOL EPh Glycol Ether/Octanoic acid/BARDAC 22** | 10/5/0.5 | 15 | PG | 15 | −4 (−2) |
| 32 | DOWANOL EPh Glycol Ether/Octanoic acid/BARDAC 22** | 10/5/1 | 15 | PG | 15 | −4 (−2) |
| 33 | DOWANOL EPh Glycol Ether/Octanoic acid/Methanol** | 10/5/1 | 15 | PG | 15 | −4 (−2) |
| 34 | DOWANOL EPh Glycol Ether/Octanoic acid/Methanol** | 10/5/2 | 15 | PG | 15 | −4 (−2) |
| 35 | DOWANOL PPh Glycol Ether | 20 | 15 | TEG | 8.6 | −2 (0) |
| 36 | DOWANOL PPh Glycol Ether | 20 | 15 | TEG | 15 | −2 (0) |

TABLE I-continued

Test Formulations including 2-(Decylthio)ethanamine Hydrochloride Which are Examples of the Present Invention

| Ex. No. | Additive | Additive Concentration (Weight Percent) | DTEA Concentration (Weight Percent) | Glycol Type | Glycol Concentration (Weight Percent) | Freezing Point* (°C.) |
|---|---|---|---|---|---|---|
| 37 | DOWANOL PPh Glycol Ether | 20 | 15 | TEG | 25 | −2 (0) |
| 38 | DOWANOL PPh Glycol Ether | 30 | 15 | PG | 15 | −2 (0) |
| 39 | DOWANOL PPh Glycol Ether | 30 | 15 | TEG | 8.6 | −6 (−4) |
| 40 | DOWANOL PPh Glycol Ether | 30 | 15 | TEG | 15 | −3 (−1) |
| 41 | DOWANOL PPh Glycol Ether | 30 | 15 | TEG | 25 | −1 (2) |
| 42 | DOWANOL PPh Glycol Ether | 40 | 15 | PG | 15 | −4 (−2) |
| 43 | DOWANOL PPh Glycol Ether | 40 | 15 | TEG | 15 | −5 (−3) |
| 44 | DOWANOL PPh Glycol Ether | 40 | 15 | TEG | 25 | −3 (−1) |
| 45 | DOWANOL PPh Glycol Ether Ether/Ammonium Xylene Sulfonate | 20/0.5 | 15 | TEG | 15 | −3 (−1) |
| 46 | DOWANOL PPh Glycol Ether/Ammonium Xylene Sulfonate | 20/0.5 | 15 | TEG | 25 | −1 (2) |
| 47 | DOWANOL PPh Glycol Ether/Sodium Xylene Sulfonate | 20/0.5 | 15 | TEG | 15 | −5 (−3) |
| 48 | DOWANOL PPh Glycol Ether/Sodium Xylene Sulfonate | 20/0.5 | 15 | TEG | 25 | −1 (2) |
| 49 | Isobutanol | 20 | 15 | PG | 15 | −6 (−4) |
| 50 | Isobutanol | 30 | 15 | PG | 15 | −8 (−6) |
| 51 | Isobutanol | 30 | 15 | TEG | 17.1 | −10 (−8) |
| 52 | Isobutanol | 40 | 15 | PG | 15 | −8 (−6) |
| 53 | Isobutanol | 50 | 15 | PG | 15 | −6 (−4) |
| 54 | Hexyl alcohol | 50 | 15 | PG | 15 | <−15a |

TABLE II

Test Formulations including 2-(Decylthio)ethanamine Hydrochloride Which are not Examples of the Present Invention

| Ex. No. | Additive | Additive Concentration (Weight Percent) | DTEA Concentration (Weight Percent) | Glycol Type | Glycol Concentration (Weight Percent) | Freezing Point* (°C.) |
|---|---|---|---|---|---|---|
| C-1 | Control (ETOX process) | — | 15 | PG | 15 | 10 (13) |
| C-2 | Control (ETOX process) | — | 35 | PG | 35 | 11 (13) |
| C-3 | Control (MEAH process) | — | 5 | PG | 5 | 4 (RT) |
| C-4 | Control (MEAH process) | — | 5 | TEG | 6.2 | 4 (RT) |
| C-5 | Control (MEAH process) | — | 10 | PG | 10 | 10 (21) |
| C-6 | Control (MEAH process) | — | 10 | TEG | 12.5 | 4 (RT) |
| C-7 | Control (MEAH process) | — | 15 | PG | 15 | 10 (13) |
| C-8 | Control (MEAH process) | — | 15 | TEG | 8.6 | 4 (RT) |
| C-9 | Control (MEAH process) | — | 15 | TEG | 15 | 14 (16) |
| C-10 | Control (MEAH process) | — | 35 | PG | 35 | 17 (19) |
| C-11 | Control (MEAH process) | — | 35 | TEG | 20.6 | 24 (27) |
| C-12 | Control (MEAH process) | — | 35 | TEG | 35 | >24 |
| C-13 | Control (Solid DTEA) | — | 15 | — | 0 | 4 (22) |
| C-14 | Control (Solid DTEA) | — | 15 | PG | 15 | 4 (22) |
| C-15 | Control (Solid DTEA) | — | 15 | TEG | 15 | 4 (22) |
| C-16 | Control (Solid DTEA) | — | 35 | PG | 5 | I |
| C-17 | Control (Solid DTEA) | — | 35 | TEG | 5 | I |
| C-18 | Simulated ETOX process | — | 35 | PG | 5 | 11 (13) |
| C-19 | Simulated ETOX process | — | 35 | PG | 35 | I |
| C-20 | Simulated ETOX process | — | 35 | TEG | 5 | 11 (13) |
| C-21 | Simulated ETOX process | — | 35 | TEG | 20.6 | 15 (17) |
| C-22 | Acetic acid | 5 | 15 | PG | 15 | 4 (RT) |
| C-23 | Acetic acid | 10 | 15 | PG | 15 | 4 (RT) |
| C-24 | Acetic acid | 15 | 15 | PG | 15 | 4 (RT) |
| C-25 | ACTINOL D25LR Tall Oil | 0.1 | 5 | PG | 5 | 4 (RT) |
| C-26 | ACTINOL D25LR Tall Oil | 0.1 | 10 | PG | 10 | 4 (RT) |
| C-27 | ACTINOL D25LR Tall Oil | 0.25 | 5 | PG | 5 | I |
| C-28 | ACTINOL D25LR Tall Oil | 0.25 | 10 | PG | 10 | 4 (RT) |
| C-29 | ACTINOL D25LR Tall Oil | 0.25 | 15 | PG | 15 | 4 (RT) |
| C-30 | ACTINOL D25LR Tall Oil | 0.5 | 5 | PG | 5 | I |
| C-31 | ACTINOL D25LR Tall Oil | 0.5 | 10 | PG | 10 | I |
| C-32 | ACTINOL D25LR Tall Oil | 0.5 | 15 | PG | 15 | 4 (RT) |
| C-33 | ACTINOL D25LR Tall Oil | 1 | 15 | PG | 15 | 4 (RT) |
| C-34 | ACTINOL D25LR Tall Oil | 1.5 | 15 | PG | 15 | 4 (RT) |
| C-35 | Ammonium xylene sulfonate | 0.1 | 15 | PG | 15 | 10 (13) |
| C-36 | Ammonium xylene sulfonate | 0.25 | 15 | PG | 15 | 10 (13) |
| C-37 | Ammonium xylene sulfonate | 0.5 | 5 | PG | 5 | I |
| C-38 | Ammonium xylene sulfonate | 0.5 | 10 | PG | 10 | 10 (21) |
| C-39 | Ammonium xylene sulfonate | 0.5 | 15 | PG | 15 | 10 (13) |

TABLE II-continued

Test Formulations including 2-(Decylthio)ethanamine Hydrochloride Which are not Examples of the Present Invention

| Ex. No. | Additive | Additive Concentration (Weight Percent) | DTEA Concentration (Weight Percent) | Glycol Type | Glycol Concentration (Weight Percent) | Freezing Point* (°C.) |
|---|---|---|---|---|---|---|
| C-40 | Ammonium xylene sulfonate | 0.75 | 15 | PG | 15 | 10 (13) |
| C-41 | Ammonium xylene sulfonate | 1 | 15 | PG | 15 | 13 (22) |
| C-42 | Ammonium xylene sulfonate | 1.25 | 15 | PG | 15 | I |
| C-43 | Ammonium xylene sulfonate | 1.5 | 15 | PG | 15 | I |
| C-44 | Ammonium xylene sulfonate | 2 | 15 | PG | 15 | I |
| C-45 | AMMONYX LO | 0.25 | 15 | PG | 15 | 10 (14) |
| C-46 | AMMONYX LO | 0.5 | 15 | PG | 15 | 10 (14) |
| C-47 | AMMONYX LO | 1 | 15 | PG | 15 | 10 (14) |
| C-48 | AMMONYX LO | 2 | 15 | PG | 15 | 10 (14) |
| C-49 | Antifoam FG-10 | 0.05 | 15 | TEG | 16.1 | 4 (RT) |
| C-50 | Antifoam FG-10 | 0.1 | 15 | TEG | 15 | 4 (RT) |
| C-51 | BARDAC 22 | 0.5 | 15 | PG | 15 | 4 (RT) |
| C-52 | BARDAC 22 | 1 | 15 | PG | 15 | 4 (RT) |
| C-53 | 1-Butanol | 10 | 15 | PG | 15 | 0 (RT) |
| C-54 | 1-Butanol/Octanoic acid** | 1/1 | 15 | PG | 15 | 4 (23) |
| C-55 | 1-Butanol/Octanoic acid** | 1/2 | 15 | PG | 15 | <4 (23)[b] |
| C-56 | 1-Butanol/Octanoic acid** | 1/5 | 15 | PG | 15 | I |
| C-57 | 1-Butanol/Octanoic acid** | 5/1 | 15 | PG | 15 | 4 (23) |
| C-58 | 1-Butanol/Octanoic acid** | 5/2 | 15 | PG | 15 | 4 (22) |
| C-59 | 1-Butanol/Octanoic acid** | 5/5 | 15 | PG | 15 | <4 (23)[b] |
| C-60 | 1-Butanol/Octanoic acid** | 10/1 | 15 | — | 0 | 4 (22) |
| C-61 | 1-Butanol/Octanoic acid** | 10/1 | 15 | PG | 5 | 4 (22) |
| C-62 | 1-Butanol/Octanoic acid** | 10/1 | 15 | PG | 10 | 4 (22) |
| C-63 | 1-Butanol/Octanoic acid** | 10/1 | 15 | PG | 15 | 4 (22) |
| C-64 | 1-Butanol/Octanoic acid** | 10/2 | 15 | PG | 15 | 0 (2) |
| C-65 | 1-Butanol/Octanoic acid** | 10/5 | 15 | PG | 15 | 0 (2) |
| C-66 | Calcim chloride | 2 | 15 | PG | 15 | 4 (RT) |
| C-67 | Cyclohexanol/Octanoic acid** | 1/1 | 15 | PG | 15 | 4 (23) |
| C-68 | Cyclohexanol/Octanoic acid** | 5/1 | 15 | PG | 15 | 4 (23) |
| C-69 | Cyclohexanol/Octanoic acid** | 5/2 | 15 | PG | 15 | 4 (22) |
| C-70 | Cyclohexanol/Octanoic acid** | 10/1 | 15 | PG | 15 | 0 (2) |
| C-71 | Cyclohexanol/Octanoic acid** | 10/2 | 15 | PG | 15 | 4 (22) |
| C-72 | Cyclohexanol/Octanoic acid** | 10/5 | 15 | — | 0 | I |
| C-73 | Cyclohexanol/Octanoic acid** | 10/5 | 15 | PG | 5 | I |
| C-74 | Decanedioic Acid** | 5 | 15 | — | 0 | I |
| C-75 | Decanedioic Acid** | 5 | 15 | TEG | 15 | I |
| C-76 | Dimethyl acetamide | 5 | 15 | PG | 15 | 4 (RT) |
| C-77 | Dimethyl acetamide | 15 | 15 | PG | 15 | 4 (RT) |
| C-78 | Dimethyl acetamide | 25 | 15 | PG | 15 | 4 (RT) |
| C-79 | Dipropylene glycol | 5 | 15 | PG | 15 | 4 (RT) |
| C-80 | Dipropylene glycol | 15 | 15 | PG | 15 | 4 (RT) |
| C-81 | Dipropylene glycol | 25 | 15 | PG | 15 | 4 (RT) |
| C-82 | DOWANOL DPM Glycol Ether | 10 | 15 | TEG | 8.6 | 4 (RT) |
| C-83 | DOWANOL DPM Glycol Ether | 10 | 15 | TEG | 15 | 4 (RT) |
| C-84 | DOWANOL DPM Glycol Ether | 10 | 15 | TEG | 25 | 4 (RT) |
| C-85 | DOWANOL DPM Glycol Ether | 20 | 15 | TEG | 8.6 | 4 (RT) |
| C-86 | DOWANOL DPM Glycol Ether | 20 | 15 | TEG | 15 | 4 (RT) |
| C-87 | DOWANOL DPM Glycol Ether | 20 | 15 | TEG | 25 | 4 (RT) |
| C-88 | DOWANOL DPM Glycol Ether | 30 | 15 | TEG | 8.6 | 4 (RT) |
| C-89 | DOWANOL DPM Glycol Ether | 30 | 15 | TEG | 15 | 4 (RT) |
| C-90 | DOWANOL DPM Glycol Ether | 30 | 15 | TEG | 25 | 4 (RT) |
| C-91 | DOWANOL EPh Glycol Ether | 10 | 15 | TEG | 8.6 | 0 (2) |
| C-92 | DOWANOL EPh Glycol Ether | 10 | 15 | TEG | 15 | 2 (4) |
| C-93 | DOWANOL EPh Glycol Ether/Octanoic acid** | 1/1 | 15 | PG | 15 | 4 (23) |
| C-94 | DOWANOL EPh Glycol Ether/Octanoic acid** | 1/2 | 15 | PG | 15 | 4 (23) |
| C-95 | DOWANOL EPh Glycol Ether/Octanoic acid** | 1/5 | 15 | PG | 15 | I |
| C-96 | DOWANOL EPh Glycol Ether/Octanoic acid** | 5/1 | 15 | PG | 15 | 4 (23) |
| C-97 | DOWANOL EPh Glycol Ether/Octanoic acid** | 5/2 | 15 | PG | 15 | 4 (23) |
| C-98 | DOWANOL EPh Glycol Ether/Octanoic acid** | 5/5 | 15 | PG | 15 | I |
| C-99 | DOWANOL EPh Glycol Ether/Octanoic acid** | 10/1 | 15 | PG | 15 | 2 (4) |
| C-100 | DOWANOL EPh Glycol Ether/Octanoic acid** | 10/2 | 15 | PG | 15 | 4 (22) |

TABLE II-continued

Test Formulations including 2-(Decylthio)ethanamine Hydrochloride Which are not Examples of the Present Invention

| Ex. No. | Additive | Additive Concentration (Weight Percent) | DTEA Concentration (Weight Percent) | Glycol Type | Glycol Concentration (Weight Percent) | Freezing Point* (°C.) |
|---|---|---|---|---|---|---|
| C-101 | DOWANOL PPh Glycol Ether | 10 | 15 | TEG | 8.6 | 0 (2) |
| C-102 | DOWANOL PPh Glycol Ether | 10 | 15 | TEG | 15 | 2 (4) |
| C-103 | DOWANOL PPh Glycol Ether | 10 | 15 | TEG | 25 | 4 (RT) |
| C-104 | DOWANOL PPh Glycol Ether | 40 | 15 | TEG | 8.6 | I |
| C-105 | DOWANOL PPh Glycol Ether/Octanoic Acid** | 1/1 | 15 | PG | 15 | 4 (23) |
| C-106 | DOWANOL PPh Glycol Ether/Octanoic Acid** | 5/1 | 15 | PG | 15 | 4 (23) |
| C-107 | DOWANOL PPh Glycol Ether/Octanoic Acid** | 5/2 | 15 | PG | 15 | 4 (23) |
| C-108 | DOWANOL PPh Glycol Ether/Octanoic Acid** | 10/1 | 15 | PG | 15 | 2 (4) |
| C-109 | DOWANOL PPh Glycol Ether/Octanoic Acid** | 10/2 | 15 | PG | 15 | 4 (22) |
| C-110 | DOWANOL PPh Glycol Ether/Octanoic Acid** | 10/5 | 15 | PG | 15 | I |
| C-111 | DOWFAX 2A1 | 0.5 | 15 | PG | 15 | 4 (RT) |
| C-112 | DOWFAX 2A1 | 0.75 | 15 | PG | 15 | 10 (RT) |
| C-113 | DOWFAX 2A1 | 1 | 15 | PG | 15 | 4 (RT) |
| C-114 | DOWFAX 2A1 | 1.5 | 15 | PG | 15 | I |
| C-115 | DOWFAX 3B2 | 0.5 | 15 | PG | 15 | 4 (RT) |
| C-116 | DOWFAX 3B2 | 1 | 15 | PG | 15 | 4 (RT) |
| C-117 | DOWFAX XD-8292 | 1 | 15 | PG | 15 | 4 (RT) |
| C-118 | Ethanol | 20 | 15 | PG | 15 | 4 (RT) |
| C-119 | Ethanol | 30 | 15 | PG | 15 | 4 (RT) |
| C-120 | Ethanol | 40 | 15 | PG | 15 | 4 (RT) |
| C-121 | Ethanol | 50 | 15 | PG | 15 | 4 (RT) |
| C-122 | Ethylene glycol | 5 | 15 | PG | 15 | 4 (RT) |
| C-123 | Ethylene glycol | 15 | 15 | PG | 15 | 4 (RT) |
| C-124 | Ethylene glycol | 25 | 15 | PG | 15 | 4 (RT) |
| C-125 | Ethylene glycol | 35 | 15 | PG | 15 | 4 (RT) |
| C-126 | GENAMIN 0-050 | 0.25 | 15 | PG | 15 | 10 (14) |
| C-127 | GENAMIN 0-050 | 0.5 | 15 | PG | 15 | 10 (14) |
| C-128 | GENAMIN 0-050 | 1 | 15 | PG | 15 | 10 (14) |
| C-129 | GENAMIN 0-050 | 2 | 15 | PG | 15 | 10 (14) |
| C-130 | GENAMIN 0-200 | 0.25 | 15 | PG | 15 | 10 (14) |
| C-131 | GENAMIN 0-200 | 0.5 | 15 | PG | 15 | 10 (14) |
| C-132 | GENAMIN 0-200 | 1 | 15 | PG | 15 | 10 (14) |
| C-133 | GENAMIN 0-200 | 2 | 15 | PG | 15 | 10 (14) |
| C-134 | GENAMIN T-020 | 0.25 | 15 | PG | 15 | 10 (14) |
| C-135 | GENAMIN T-020 | 0.5 | 15 | PG | 15 | 10 (14) |
| C-136 | GENAMIN T-020 | 1 | 15 | PG | 15 | 10 (14) |
| C-137 | GENAMIN T-020 | 2 | 15 | PG | 15 | 10 (14) |
| C-138 | Glutaric Acid** | 5 | 15 | — | 0 | 4 (22) |
| C-139 | Glutaric Acid** | 5 | 15 | PG | 15 | 4 (22) |
| C-140 | Glutaric Acid** | 5 | 15 | TEG | 15 | 4 (22) |
| C-141 | Glycerin | 5 | 15 | PG | 15 | 13.5 (RT) |
| C-142 | Glycerin | 15 | 15 | PG | 15 | 13.5 (RT) |
| C-143 | Glycerin | 25 | 15 | PG | 15 | 4 (RT) |
| C-144 | 2,5-Hexanediol | 20 | 15 | PG | 15 | 4 (RT) |
| C-145 | 2,5-Hexanediol | 30 | 15 | PG | 15 | 4 (RT) |
| C-146 | 2,5-Hexanediol | 40 | 15 | PG | 15 | 4 (RT) |
| C-147 | 2,5-Hexanediol | 50 | 15 | PG | 15 | 4 (RT) |
| C-148 | Hexyl alcohol | 20 | 15 | PG | 15 | I |
| C-149 | Hexyl alcohol | 30 | 15 | PG | 15 | I |
| C-150 | Hexyl alcohol | 40 | 15 | PG | 15 | I |
| C-152 | Hexyl alcohol | 67 | 15 | PG | 15 | 4 (RT) |
| C-153 | Hexylene glycol | 10 | 15 | PG | 15 | 4 (RT) |
| C-154 | Hexylene glycol | 20 | 15 | PG | 15 | 4 (RT) |
| C-155 | Hexylene glycol | 30 | 15 | PG | 15 | 4 (RT) |
| C-156 | Hexylene glycol | 40 | 15 | PG | 15 | 4 (RT) |
| C-157 | Hexylene glycol | 50 | 10.6 | PG | 11 | 0 (2) |
| C-158 | Isopropanol | 10 | 15 | PG | 15 | 4 (RT) |
| C-159 | Isopropanol | 20 | 15 | PG | 15 | 2 (4) |
| C-160 | Isopropanol | 30 | 15 | PG | 15 | 2 (4) |
| C-161 | Isopropanol | 40 | 15 | PG | 15 | 2 (4) |
| C-162 | Isopropanol | 50 | 15 | PG | 15 | 2 (4) |
| C-163 | KELIG 3000D | 1 | 15 | PG | 15 | I |
| C-164 | KELIG 3000D | 2 | 15 | PG | 15 | I |
| C-165 | Magnesium chloride | 2 | 15 | PG | 15 | 5 (RT) |
| C-166 | Magnesium chloride | 4 | 15 | PG | 15 | 5 (RT) |
| C-167 | Magnesium chloride | 6 | 15 | PG | 15 | I |
| C-168 | MARASPERSE B-22 | 1 | 15 | PG | 15 | I |
| C-169 | MARASPERSE B-22 | 2 | 15 | PG | 15 | I |
| C-170 | MARASPERSE N-22 | 1 | 15 | PG | 15 | I |
| C-171 | MARASPERSE N-22 | 2 | 15 | PG | 15 | I |

TABLE II-continued

Test Formulations including 2-(Decylthio)ethanamine Hydrochloride Which are not Examples of the Present Invention

| Ex. No. | Additive | Additive Concentration (Weight Percent) | DTEA Concentration (Weight Percent) | Glycol Type | Glycol Concentration (Weight Percent) | Freezing Point* (°C.) |
|---|---|---|---|---|---|---|
| C-172 | N-Methylpyrollidone | 0.5 | 15 | PG | 15 | 5 (RT) |
| C-173 | N-Methylpyrollidone | 1 | 15 | PG | 15 | 5 (RT) |
| C-174 | N-Methylpyrollidone | 2 | 15 | PG | 15 | 5 (RT) |
| C-175 | N-Methylpyrollidone | 4 | 15 | PG | 15 | 5 (RT) |
| C-176 | NINOL 11-CM | 1 | 15 | PG | 15 | 4 (RT) |
| C-177 | NINOL 11-CM | 2 | 15 | PG | 15 | 4 (RT) |
| C-178 | NINOL 11-CM | 5 | 15 | PG | 15 | I |
| C-179 | NINOL 11-CM | 10 | 15 | PG | 15 | I |
| C-180 | NINOL 11-CM | 20 | 15 | PG | 15 | I |
| C-181 | NINOL 11-CM | 30 | 15 | PG | 15 | I |
| C-182 | NORLIG A | 1 | 15 | PG | 15 | I |
| C-183 | NORLIG A | 2 | 15 | PG | 15 | I |
| C-184 | Octanedioic Acid** | 5 | 15 | — | 0 | I |
| C-185 | Octanoic Acid** | 1 | 15 | — | 0 | <4 (23) |
| C-186 | Octanoic Acid** | 1 | 15 | PG | 15 | 4 (23) |
| C-187 | Octanoic Acid** | 1 | 15 | TEG | 15 | <4 (23) |
| C-188 | Octanoic Acid** | 2 | 15 | — | 0 | I |
| C-189 | Octanoic Acid** | 2 | 15 | PG | 15 | <4 (23) |
| C-190 | Octanoic Acid** | 2 | 15 | TEG | 15 | I |
| C-191 | Octanoic Acid** | 5 | 15 | — | 0 | I |
| C-192 | Octanoic Acid** | 5 | 15 | TEG | 15 | I |
| C-193 | PC 825 | 1 | 15 | PG | 15 | 4 (RT) |
| C-194 | PC 825 | 2 | 15 | PG | 15 | I |
| C-195 | Polyglycol 26-2 | 1 | 15 | PG | 15 | 4 (RT) |
| C-196 | Potassium chloride | 2 | 15 | PG | 15 | 4 (RT) |
| C-197 | Propionic Acid** | 5 | 15 | — | 0 | 4 (22) |
| C-198 | Propionic Acid** | 5 | 15 | PG | 15 | 4 (22) |
| C-199 | Propionic Acid** | 5 | 15 | TEG | 15 | 4 (22) |
| C-200 | Propylene glycol | 5 | 5 | PG | 10 | 4 (RT) |
| C-201 | Propylene glycol | 5 | 15 | PG | 20 | 4 (RT) |
| C-202 | Propylene glycol | 10 | 5 | PG | 15 | 4 (RT) |
| C-203 | Propylene glycol | 15 | 15 | PG | 30.2 | 4 (RT) |
| C-204 | Propylene glycol | 25 | 15 | PG | 40.2 | 4 (RT) |
| C-205 | Propylene glycol | 35 | 15 | PG | 50.2 | 4 (RT) |
| C-206 | Sodium bisulfite | 1 | 15 | PG | 15 | 10 (RT) |
| C-207 | Sodium bisulfite/ammonium xylene sulfonate | 1/0.5 | 15 | PG | 15 | 10 (RT) |
| C-208 | Sodium bisulfite/sodium xylene sulfonate | 1/0.5 | 15 | PG | 15 | 10 (RT) |
| C-209 | Sodium citrate | 0.5 | 15 | PG | 15 | 4 (RT) |
| C-210 | Sodium meta bisulfite | 1 | 15 | PG | 15 | 10 (RT) |
| C-211 | Sodium sulfate | 2 | 15 | PG | 15 | I |
| C-212 | Sodium sulfite | 2 | 15 | PG | 15 | I |
| C-213 | Sodium thiosulfate | 1 | 15 | PG | 15 | I |
| C-214 | Sodium xylene sulfonate | 0.1 | 15 | PG | 15 | 10 (13) |
| C-215 | Sodium xylene sulfonate | 0.25 | 15 | PG | 15 | 10 (13) |
| C-216 | Sodium xylene sulfonate | 0.5 | 15 | PG | 15 | 10 (13) |
| C-217 | Sodium xylene sulfonate | 0.75 | 15 | PG | 15 | 10 (13) |
| C-218 | Sodium xylene sulfonate | 1 | 15 | PG | 15 | 13 (22) |
| C-219 | Sodium xylene sulfonate | 1.25 | 15 | PG | 15 | 13 (22) |
| C-220 | Sodium xylene sulfonate | 1.5 | 15 | PG | 15 | I |
| C-221 | Sodium xylene sulfonate | 2 | 15 | PG | 15 | I |
| C-222 | Sodium xylene sulfonate/DOWFAX 2A1 | 0.5/0.5 | 15 | PG | 15 | I |
| C-223 | Tetraethylene glycol | 5 | 15 | PG | 15 | 5 (RT) |
| C-224 | Tetraethylene glycol | 5 | 35 | TEG | 40 | >24 (50) |
| C-225 | Tetraethylene glycol | 6.4 | 15 | TEG | 15 | 4 (RT) |
| C-226 | Tetraethylene glycol | 10 | 5 | TEG | 16.7 | 4 (RT) |
| C-227 | Tetraethylene glycol | 10 | 15 | PG | 15 | 5 (RT) |
| C-228 | Tetraethylene glycol | 10 | 15 | TEG | 25 | 4 (RT) |
| C-229 | Tetraethylene glycol | 10 | 15 | TEG | 27.1 | 4 (RT) |
| C-230 | Tetraethylene glycol | 15 | 10 | TEG | 23.6 | 4 (RT) |
| C-231 | Tetraethylene glycol | 15 | 15 | PG | 15 | 5 (RT) |
| C-232 | Tetraethylene glycol | 16.4 | 15 | TEG | 25 | 4 (RT) |
| C-233 | Tetraethylene glycol | 20 | 15 | PG | 15 | 5 (RT) |
| C-234 | Tetraethylene glycol | 20 | 15 | TEG | 37.1 | 4 (RT) |
| C-235 | Tetraethylene glycol | 20 | 35 | TEG | 55.2 | >24 |
| C-236 | Tetraethylene glycol | 30 | 15 | TEG | 47.1 | 4 (RT) |
| C-237 | Tetraethylene glycol | 40 | 15 | TEG | 57.1 | I |
| C-238 | TRITON X-100 | 0.5 | 15 | PG | 15 | 4 (RT) |
| C-239 | TRITON X-100 | 1 | 15 | PG | 15 | 4 (RT) |

TABLE II-continued

Test Formulations including 2-(Decylthio)ethanamine Hydrochloride Which are not Examples of the Present Invention

| Ex. No. | Additive | Additive Concentration (Weight Percent) | DTEA Concentration (Weight Percent) | Glycol Type | Glycol Concentration (Weight Percent) | Freezing Point* (°C.) |
|---|---|---|---|---|---|---|
| C-240 | TWEEN 80 | 0.5 | 15 | PG | 15 | 4 (RT) |

Explanation of terms used in Tables I and II:
PG - Propylene glycol
TEG - Tetraethylene glycol
RT - Room Temperature
I - Incompatible. The sample was nonhomogeneous either when made or after a freeze-thaw cycle.
[a]A thin liquid layer was observed on the bottom of this sample
[b]formed a cloudy liquid at 4° C.
*The first number is the temperature where crystals were first observed in at least one aliquot of the sample. The temperature in parentheses is the last temperature tested where the sample was clear.
**Solid DTEA used

CHEMICAL FORMULATIONS OF TRADE NAME PRODUCTS USED IN DTEA FREEZE-THAW STUDIES

ACTINOL TM D25LR Tall Oil - High rosin distilled tall oil cut with tall oil fatty acid. High rosin content is 25 percent. (ACTINOL TM is a trademark of the Arizona Chemical Company; ACTINOL TM D25LR Tall Oil is a product of The Arizona Chemical Company)

AMMONYX TM LO - Lauryl dimethylamine oxide 29–31 percent
Water balance
(AMMONYX TM is a trademark of The Onyx Chemical Company; AMMONYX TM LO is a product of The Onyx Chemical Company)

Antifoam FG-10 - Polydimethyl siloxane 10 percent
remainder emulsifiers, preservatives and water
(Antifoam FG-10 is a product of Dow Corning Corporation)

BARDAC TM 22 - decyl dimethyl ammonium chloride 50 percent
Isopropanol 20 percent
Water 30 percent
(BARDAC TM is a trademark of Lonza, Inc.; BARDAC TM 22 is a product of Lonaz, Inc.)

DOWANOL TM DPM Glycol Ether-Dipropylene glycol monomethyl ether 99 percent
(DOWANOL TM is a trademark of The Dow Chemical Company; DOWANOL TM DPM Glycol Ether is a product of The Dow Chemical Company)

DOWANOL TM EPh Glycol Ether - Ethylene glycol phenyl ether 90 percent
Diethylene glycol phenyl ether 10 percent
(DOWANOL TM is a trademark of The Dow Chemical Company; DOWANOL TM EPh Glycol Ether is a product of The Dow Chemical Company)

DOWANOL TM PPh Glycol Ether-Propylene glycol phenyl ether 93 percent
Dipropylene glycol phenyl ether 7 percent
(DOWANOL TM is a trademark of The Dow Chemical Company; DOWANOL TM PPh Glycol Ether is a product of The Dow Chemical Company)

DOWFAX TM 2A1 - Dodecyl(sulfophenoxy)benzenesulfonic acid, disodium salt and Oxybis(dodecylbenzenesulfonic acid), disodium salt 47 percent
Sodium sulfate 1 percent
Sodium chloride 3 percent
Water balance
(DOWFAX TM is a trademark of The Dow Chemical Company; DOWFAX TM 2A1 is a product of The Dow Chemical Company)

DOWFAX TM 3B2 - Decyl(sulfophenoxy)benzenesulfonic acid, disodium salt, and Oxybis(decylbenzenesulfonic acid), disodium salt 47 percent -continued

CHEMICAL FORMULATIONS OF TRADE NAME PRODUCTS USED IN DTEA FREEZE-THAW STUDIES sodium sulfate 3 percent
sodium chloride 3 percent
Methylene chloride 2 percent
Water balance
(DOWFAX TM is a trademark of The Dow Chemical Company; DOWFAX TM 3B2 is a product of The Dow Chemical Company)

DOWFAX TM XD-8292 - Hexyl(sulfophenoxy)benzene sulfonic acid disodium salt and Oxybis(hexylbenzenesulfonic acid disodium salt 45 percent
Sodium sulfate 3 percent
Sodium chloride 3 percent
Methylene chloride 2 percent
Water balance
(DOWFAX TM is a trademark of The Dow Chemcial Company; DOWFAX TM XD-8292 is a product of The Dow Chemical Company)

GENAMIN TM O-050 - Oleylamine + 5 ethylene oxides 100 percent
(GENAMIN TM is a trademark of The American Hoechst Corporation; GENAMIN TM O-050 is a product of The American Hoechst Corporation)

GENAMIN TM O-200 - Oleylamine + 20 ethylene oxides 100 percent
(GENAMIN TM is a trademark of The American Hoechst Corporation; GENAMIN TM O-200 is a product of The American Hoechst Corporation)

GENAMIN TM T-200 - Tallowamine + 2 ethylene oxides 100 percent
(GENAMIN TM is a trademark of The American Hoechst Corporation; GENAMIN TM T-020 is a product of The American Hoechst Corporation)

KELIG TM 3000D - Lignosulfonate 100 percent
(KELIG TM is a trademark of Reed Lignin Incorporated; KELIG TM 3000D is a product of Reed Lignin Incorporated)

MARASPERSE TM B-22 - Sodium lignosulfonate 100 percent
(MARASPERSE TM is a trademark of Reed Lignin Incorporated; MARASPERSE TM B-22 is a product of Reed Lignin Incorporated)

MARASPERSE TM N-22 - Highly purified sodium lignosulfonate 100 percent
(MARASPERSE TM is a trademark of Reed Lignin Incorporated; MARASPERSE TM N-22 is a product of Reed Lignin Incorporated)

NINOL TM 11-CM - Coconut diethanolamide 100 percent
(NINOL TM is a trademark of The Stepan Company;

-continued

| CHEMICAL FORMULATIONS OF TRADE NAME PRODUCTS USED IN DTEA FREEZE-THAW STUDIES | |
|---|---|
| NINOL TM 11-CM is a product of The Stepan Company) | |
| NORLIG TM A - Calcium Lignosulfonate (NORLIG TM is a trademark of Reed Lignin Incorporated; NORLIG TM A is a product of Reed Lignin Incorporated) | 100 percent |
| PC 825 - Lignosulfonic acid, ethoxylated, sodium salt (PC 825 is a product of Westvaco Corporation) | 100 percent |
| TRITON TM X-100 - Octylphenoxy polyethoxyethanol (TRITON TM is a trademark of The Rohm & Haas Company; TRITON TM X-100 is a product of The Rohm & Haas Company) | 100 percent |
| TWEEN TM 80 - Polyoxyethylene-20-sorbitan monooleate (TWEEN TM is a trademark of Atlas Chemical Industries, Incorporated; TWEEN TM 80 is a product of Atlas Chemical Industries, Incorporated) | 100 percent |

Generally, alcohol additives, such as 1-butanol, cyclohexanol, hexyl alcohol, and isobutanol, and glycol ethers, such as ethylene glycol phenyl ether and propylene glycol phenyl ether, give the best reduction of freezing point for a DTEA formulation and are preferred additives. Such additives, or a mixture of two or more such additives, must be used in an amount effective to result in an antimicrobial composition that has a freezing point of less than 0° C. at atmospheric pressure. The use of these alcohol and glycol ether additives also has the added advantage in that they decrease the amount of foam produced during formulation. What foam is produced typically dissipates in a few minutes.

Based on the total weight of 1-butanol, cyclohexanol, hexyl alcohol, isobutanol, ethylene glycol phenyl ether, propylene glycol phenyl ether, or a mixture thereof and 2-(decylthio)ethanamine present in an antimicrobial composition of the present invention, preferably the antimicrobial composition comprises from about 15 to about 95 weight percent 2-(decylthio)-ethanamine and from about 5 to about 85 weight percent 1-butanol, cyclohexanol, hexyl alcohol, isobutanol, ethylene glycol phenyl ether, propylene glycol phenyl ether, or a mixture thereof.

Based upon the total weight of an antimicrobial composition of the present invention, preferrably the antimicrobial composition comprises:

a. from about 12 to about 19 weight percent 2-(decylthio)ethanamine:
b. from about 8 to about 18 weight percent propylene glycol, tetraethylene glycol or a mixture thereof;
c. from about 1 to about 60 weight percent 1-butanol, cyclohexanol, hexyl alcohol, isobutanol, ethylene glycol phenyl ether, propylene glycol phenyl ether, or a mixture thereof: and
d. from about 10 to about 75 weight percent water.

More preferred ranges for the preferred and glycol additives are from about 15 to about 35 weight percent 1-butanol, from about 5 to about 45 weight percent cyclohexanol, from about 45 to about 60 weight percent hexyl alcohol, from about 15 to about 50 weight percent isobutanol, from about 25 to about 45 weight percent ethylene glycol phenyl ether, or from about 15 to about 45 weight percent propylene glycol phenyl ether. Preferably, the antimicrobial composition has a freezing point of less than −4° C. at atmospheric Another preferred additive, particularly when used with cyclohexanol or ethylene glycol phenyl ether, is octanoic acid when used in a range from about 1 to about 10 weight percent of a total DTEA composition.

Fifty percent hexyl alcohol does not freeze at the lowest temperature tested (−15° C.). However, a thin liquid layer is observed at the bottom of the sample which indicates some separation of the composition.

Generally, an increase in DTEA concentration causes an increase in the freezing point.

Flash Point Determination of Selected Formulations

From Table I, 1-butanol, cyclohexanol, and isobutanol are seen to be among the best additives in reducing the freezing point for a DTEA formulation. Since the flash points of these alcohols are quite low, the flash point of a DTEA formulation to which these alcohols are added becomes an important consideration in choosing a final formulation. The most desirable formulation should have a flash point above 200° F. (93° C.) so that it would not be as heavily regulated as formulations below this temperature. If a flash point above 200° F. (93° C.) is not feasible, it is desirable for the flash point to be above 100° F. (37° C.) so that the formulation will be classified as a combustible liquid rather than a flammable liquid. The handling regulations for a combustible liquid are generally much more lenient than for a flammable liquid. Several potential candidate formulations were analyzed for flash point. The results are listed in Table III. As can be seen from Table III, many of the compositions of the present invention have acceptable flash points.

TABLE III

Flash Points of Selected 15 Percent Formulations of 2-(Decylthio)Ethanamine Hydrochloride

| Additive | Additive Concentration (Weight Percent) | Flash Point |
|---|---|---|
| Cyclohexanol | 20 | 178° F. (81° C.) |
| 1-Butanol[b] | 10 | 122° F. (50° C.) |
| 1-Butanol[a] | 15 | 118° F. (48° C.) |
| 1-Butanol[b] | 15 | 117° F. (47° C.) |
| 1-Butanol[a] | 20 | 115° F. (46° C.) |
| 1-Butanol[b] | 20 | 114° F. (46° C.) |
| 1-Butanol[a] | 30 | 114° F. (46° C.) |
| Isobutanol[a] | 20 | 103° F. (39° C.) |

[a]2-(Decylthio)ethanamine hydrochloride in propylene glycol
[b]2-(Decylthio)ethanamine hydrochloride in tetraethylene glycol

What is claimed is:

1. An antimicrobial composition comprising:

a. an antimicrobially effective amount of 2-(decylthio)ethanamine; and
b. an amount of 1-butanol, cyclohexanol hexyl alcohol, isobutanol, ethylene glycol phenyl ether, propylene glycol phenyl ether, or a mixture thereof, effective to result in the antimicrobial composition having a freezing point of less than 0° C. at atmospheric pressure.

2. The antimicrobial composition of claim 1 comprising:

a. from about 15 to about 95 weight percent 2-(decylthio)ethanamine: and
b. from about 5 to about 85 weight percent 1-butanol, cyclohexanol, hexyl alcohol, isobutanol, ethylene glycol phenyl ether, propylene glycol phenyl ether, or a mixture thereof:

based on the total weight of 1-butanol, cyclohexanol, hexyl alcohol, isobutanol, ethylene glycol phenyl ether, propylene glycol phenyl ether, or a mixture thereof, and 1-(decylthio)ethanamine.

3. The antimicrobial composition of claim 1 wherein the 2-(decylthio)ethanamine is in the form of the [2-(decylthio)ethanamine] hydrochloride acid addition salt.

4. The antimicrobial composition of claim 1 comprising, based upon the total weight of such composition:

a. from about 12 to about 19 weight percent 2-(decylthio)ethanamine:
b. from about 8 to about 18 weight percent propylene glycol, tetraethylene glycol or a mixture thereof:
c. from about 1 to about 60 weight percent 1-butanol, cyclohexanol, hexyl alcohol, isobutanol, ethylene glycol phenyl ether, propylene glycol phenyl ether, or a mixture thereof; and
d. from about 10 to about 75 weight percent water.

5. The antimicrobial composition of claim 4 comprising from about 15 to about 35 weight percent 1-butanol and wherein the antimicrobial composition has a freezing point of less than −4° C. at atmospheric pressure.

6. The antimicrobial composition of claim 4 comprising from about 5 to about 45 weight percent cyclohexanol and wherein the antimicrobial composition has a freezing point of less than −4° C. at atmospheric pressure.

7. The antimicrobial composition of claim 4 comprising from about 15 to about 50 weight percent isobutanol and wherein the antimicrobial composition has a freezing point of less than −4° C. at atmospheric pressure.

8. The antimicrobial composition of claim 4 comprising from about 25 to about 45 weight percent ethylene glycol phenyl ether and wherein the antimicrobial composition has a freezing point of less than −4° C. at atmospheric pressure.

9. The antimicrobial composition of claim 4 comprising from about 15 to about 45 weight percent propylene glycol phenyl ether and wherein the antimicrobial composition has a freezing point of less than −4° C. at atmospheric pressure.

10. The antimicrobial composition of claim 4 further comprising from about 1 to about 10 weight percent octanoic acid.

11. A method for inhibiting microorganisms in a microbial habitat comprising contacting said microbial habitat with an antimicrobially effective amount of an antimicrobial composition comprising:

a. an antimicrobially effective amount of 2-(decylthio)ethanamine; and
b. an amount of 1-butanol, cyclohexanol, hexyl alcohol, isobutanol, ethylene glycol phenyl ether, propylene glycol phenyl ether, or a mixture thereof, effective to result in the antimicrobial composition having a freezing point of less than 0° C. at atmospheric pressure.

12. The method of claim 11 wherein the antimicrobial composition comprises:

a. from about 15 to about 95 weight percent 2-(decylthio)ethanamine; and
b. from about 5 to about 85 weight percent 1-butanol, cyclohexanol, hexyl alcohol, isobutanol, ethylene glycol phenyl ether, propylene glycol phenyl ether, or a mixture thereof:

based on the total weight of 1-butanol, cyclohexanol, hexyl alcohol, isobutanol, ethylene glycol phenyl ether, propylene glycol phenyl ether, or a mixture thereof and 2-(decylthio)ethanamine.

13. The method of claim 11 wherein the antimicrobial composition is used in an amount to provide from about 0.01 part per million to about 5,000 parts per million by weight of 2-(decylthio)ethanamine to the microbial habitat.

14. The method of claim 11 wherein the 2-(decylthio)ethanamine is in the form of the hydrochloride acid addition salt.

15. The method of claim 14 wherein the antimicrobial composition further comprises from about 1 to about 10 weight percent octanoic acid.

16. The method of claim 11 wherein the antimicrobial composition comprises, based upon the total weight of such composition:

a. from about 12 to about 19 weight percent 2-(decylthio)ethanamine;
b. from about 8 to about 18 weight percent propylene glycol, tetraethylene glycol or a mixture thereof:
c. from about 1 to about 60 weight percent 1-butanol, cyclohexanol, hexyl alcohol, isobutanol, ethylene glycol phenyl ether, propylene glycol phenyl ether, or a mixture thereof: and
d. from about 10 to about 75 weight percent water.

17. The method of claim 16 wherein the antimicrobial composition comprises from about 15 to about 35 weight percent 1-butanol and wherein the antimicrobial composition has a freezing point of less than −4° C. at atmospheric pressure.

18. The method of claim 16 wherein the antimicrobial composition comprises from about 5 to about 45 weight percent cyclohexanol and wherein the antimicrobial composition has a freezing point of less than −4° C. at atmospheric pressure.

19. The method of claim 16 wherein the antimicrobial composition comprises from about 15 to about 50 weight percent isobutanol and wherein the antimicrobial composition has a freezing point of less than −4° C. at atmospheric pressure.

20. The method of claim 16 wherein the antimicrobial composition comprises from about 25 to about 45 weight percent ethylene glycol phenyl ether and wherein the antimicrobial composition has a freezing point of less than −4° C. at atmospheric pressure.

21. The method of claim 16 wherein the antimicrobial composition comprises from about 15 to about 45 weight percent propylene glycol phenyl ether and wherein the antimicrobial composition has a freezing point of less than −4° C. at atmospheric pressure.

* * * * *